Nov. 1, 1927.  
J. A. MAGNUSSON  
1,647,237  
LOCOMOTIVE MAIN DRIVE AXLE JOURNAL  
Filed Jan. 24, 1927  
2 Sheets-Sheet 1

Inventor  
John A. Magnusson  
By P. J. Elliott  
Attorney

Nov. 1, 1927.  1,647,237
J. A. MAGNUSSON
LOCOMOTIVE MAIN DRIVE AXLE JOURNAL
Filed Jan. 24, 1927   2 Sheets-Sheet 2

Inventor
John A. Magnusson
By R. J. Elliott
Attorney

Patented Nov. 1, 1927.

1,647,237

UNITED STATES PATENT OFFICE.

JOHN A. MAGNUSSON, OF TACOMA, WASHINGTON.

LOCOMOTIVE MAIN-DRIVE-AXLE JOURNAL.

Application filed January 24, 1927. Serial No. 163,014.

My invention relates to the bearings of the main drive axle of a locomotive and has for its objects to provide a means to support that portion of the weight of the locomotive assigned to the said main drive axle and a means to take the pounding of the driving forces applied to the wheels by the engine connecting rods.

In the preferred form of my invention I arrange the two said means entirely independent of each other but, in applying my invention to locomotives already in use, both of said means may be incorporated into a single pair of my improved journals.

A further object is to provide means for supporting that part of the weight of the locomotive assigned to said axle from the center of the axle and transferring the said supporting forces to the two sides of the locomotive, said supporting bearing being entirely independent of the longitudinal forces applied by the engine connecting rods.

Further objects are to improve the journals of a locomotive, first, whereby they are provided with adequate side bearing surfaces to receive the horizontal forces applied to the main axle by the engine connecting rods; second, whereby they will span about three-quarters of each side of the main drive axle, thereby reducing the wear thereon due to the horizontal pounding of the engine, as compared with the wear of the brasses at present in use which span only the upper half of each side; third, which may be easily adjusted to take up any side wear which may occur therein; fourth, whereby they will accommodate themselves to any distortion of the locomotive frame or any uneven wearing of the journal box, pedestal jaws, shoes or wedges; and fifth, whereby they will effectively reduce the danger of hot bearings.

I attain these and other objects by the devices and arrangements illustrated in the accompanying drawings, in which—

Figure 1:
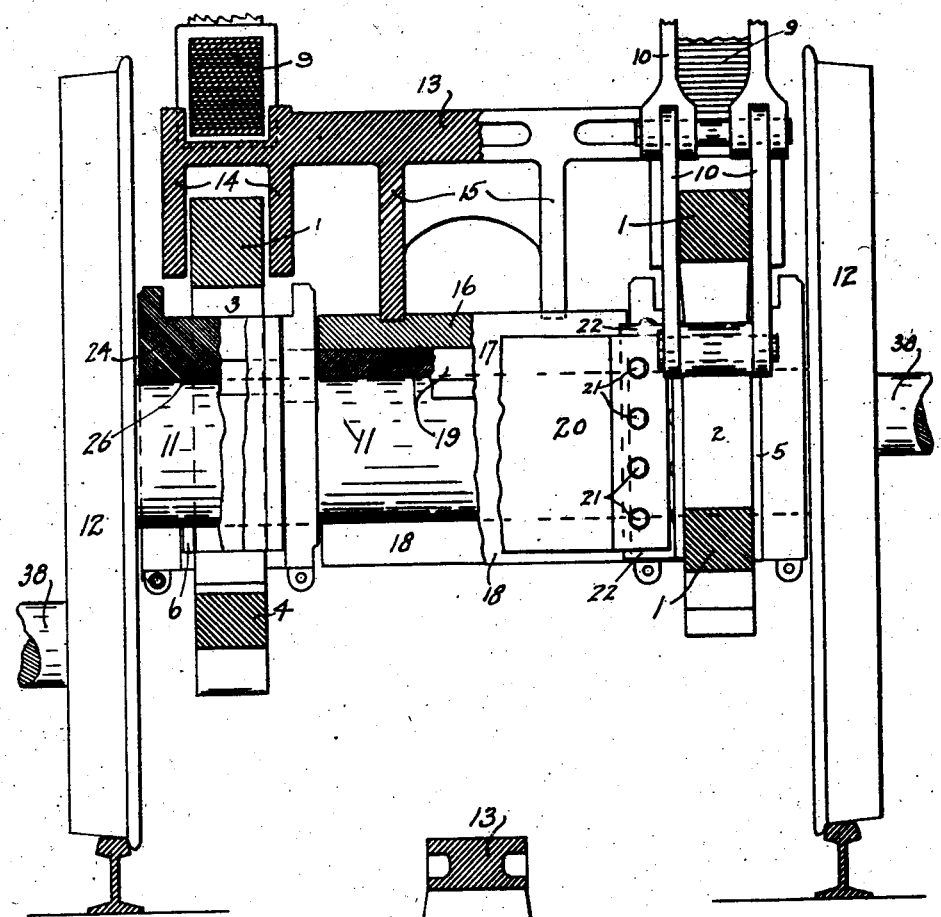
Figure 2:
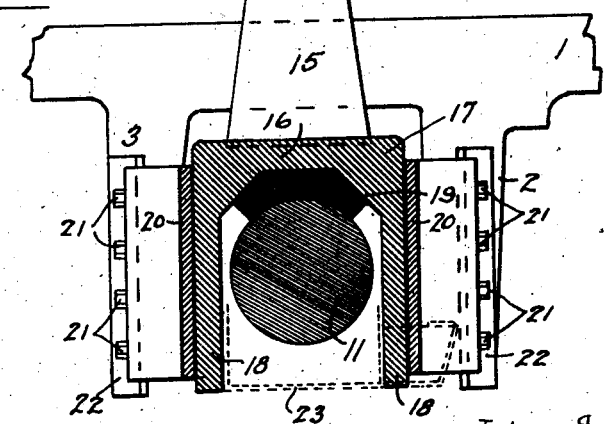
Figures 3, 4, 5, 6:
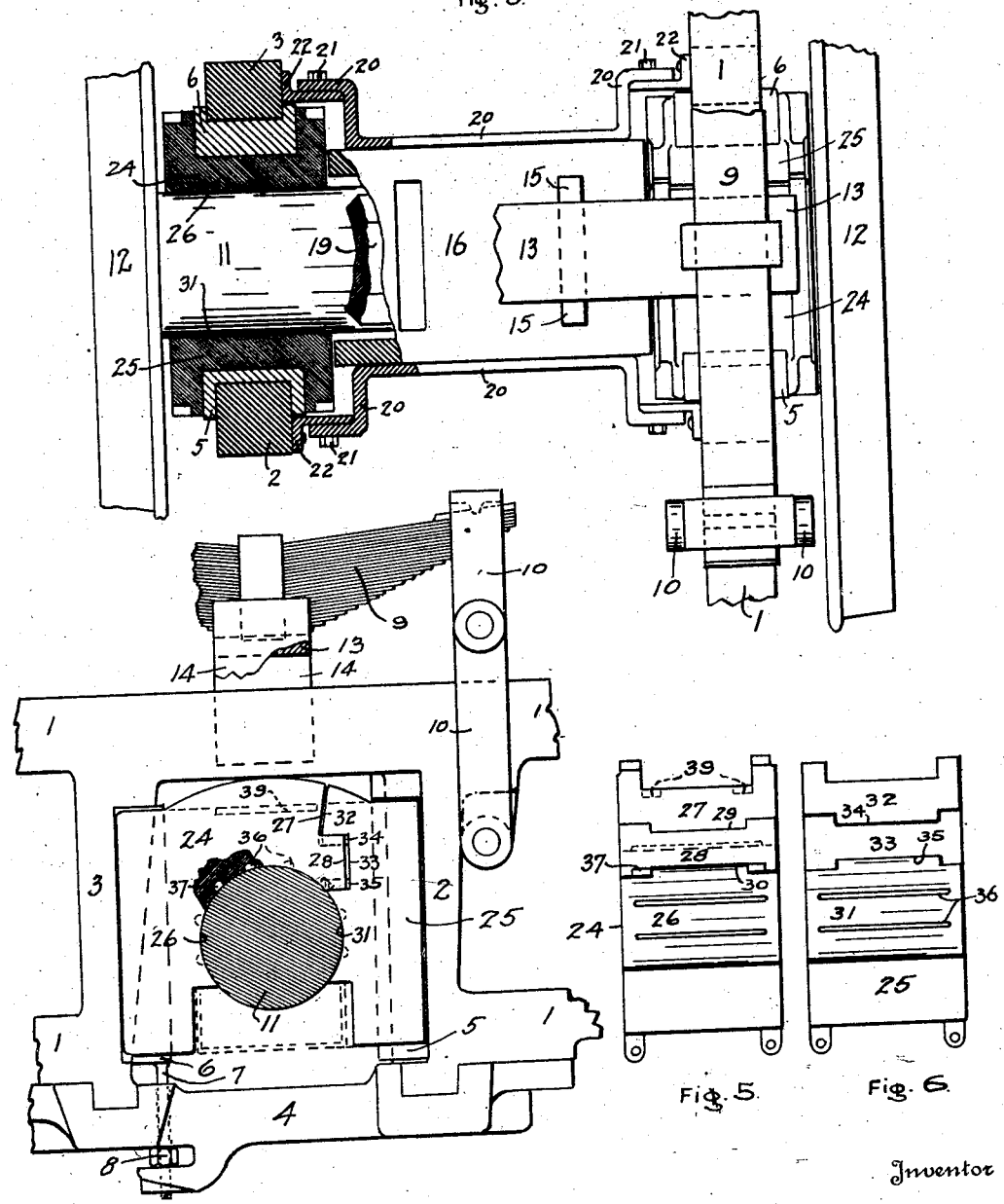

Fig. 1 is a vertical elevation of the main drive axle and its cooperating parts, portions thereof being shown in section to reveal the construction; Fig. 2 is a cross-section of the main drive axle and of the central weight-carrying journal box thereof; Fig. 3 is a plan view, partly in section, of my improved three-box main axle journal; Fig. 4 is a side elevation of one of the side or thrust-carrying journal boxes; and Figs. 5 and 6 are elevations of the two parts thereof, removed from the axle and each viewed as from the axle.

Similar numerals of reference refer to similar parts throughout the several views.

The main drive axle of a locomotive is subjected not only to the work of supporting its share of the locomotive weight, but also to the horizontal, or almost horizontal, forces due to the connecting rods of the locomotive engine. However, the bearing brasses, usually provided for such main drive axle, engage only the upper half of the bearing, the same as in bearings in which there is substantially no horizontal stress, and therefore an insufficient surface is provided for such horizontal forces. These horizontal forces may amount to a greater load than the vertical force or weight applied to the bearing and yet only one-half the amount of bearing surface is provided for such horizontal forces as is provided for the vertical force, hence the bearing brasses wear away in a horizontal direction faster than in a vertical direction. This is especially true on account of the varying intensity and angle of the said horizontal forces, both of which factors tend to increase the wear of the brasses. Also, the pounding of the connecting rods on the axle bearings, in an almost horizontal direction, tends to wear away the upper portions of the vertical surfaces of the journal box, pedestal jaws, shoes and wedges, more than the lower portions thereof, and therefore tends to prevent keeping the journal box tight within the space formed by said vertical surfaces, and this fact further increases the wear thereof and also increases the pounding action thereon.

It is to overcome these conditions that I have invented the hereinafter-described side bearings, said bearings being adapted to carry both the vertical and horizontal forces thereon, and to readily take up any wear thereof. My improved side journal enveloping, as it does, both sides of the axle, largely prevents the uneven wear of the said vertical surfaces and also, being of a compound or split character, there is a slight give between the parts thereof, thereby keeping the said vertical surfaces of the journal box in close contact with those of the shoe, or wedge, even if there should be such an uneven wear thereof.

However, in the preferred form of my invention, I relieve the said side bearings of substantially all vertical forces, and provide a long central bearing adapted to carry only said vertical forces and, in thus relieving the side bearings, I further extend their life, because, if the weight of the locomotive were applied to the said side bearings, their upper portions would wear away and distort those portions of the bearing surface which take care of the horizontal forces, and therefore reduce their area and cause a more rapid wear of such portions as take such horizontal forces. In other words, a bearing brass should not be used to take care of forces in two radically different directions because the wear due to one force will reduce the area of the surface taking care of the other force.

Referring now to the drawings:—The frame 1, on each side of the locomotive, is of the usual construction and is provided with pedestal jaws 2 and 3, for each axle bearing, between which the bearing box is held and in which it is permitted free vertical motion. The lower ends of the pedestal jaws 2 and 3 are secured together by a suitable pedestal binder 4. A U-shaped shoe 5 is positioned between the pedestal 2 and the flanges of the bearing box, said shoe and pedestal having vertical contact surfaces. A second U-shaped wedge-shoe 6 is positioned between the pedestal 3 and the flanges of the bearing box, said wedge shoe and pedestal having complementary inclined or wedged contact surfaces, whereby the space between the shoes 5 and 6, in which the bearing box rides, may be adjusted in width by raising or lowering the wedge shoe 6 on the pedestal 3. The position of the said wedge shoe 6 is controlled by the bolt 7 and nut 8 (Fig. 4). Also, in the usual construction of a locomotive, the weight of the boiler and other parts is transferred directly to the frame 1, on each side of the locomotive, and the said frames 1 are hung from the ends of the several side springs 9, by means of pairs of links 10. The centers of the leaf-springs 9 are each supported by saddles (not shown in the drawings) which span the thickness of said frames 1, and which are provided with legs which pass downward on each side of said frames 1, and rest directly on the tops of the several journal boxes. These journal boxes, in the usual construction, are provided with brasses which are interposed between the box and the top side of the axle 11, immediately inside of the wheels 12 of the locomotive. All of the above applies to the usual construction of locomotives.

In my preferred construction, however, I support the locomotive frames 1, at the main drive axle, by means of a special saddle 13 (Figs. 1 and 2) which extends across the locomotive, under the boiler, and which supports the centers of the two side springs 9 at its ends, said side springs 9 fitting in suitable receiving pockets therein. This saddle 13 is provided with two depending guide flanges 14, at each end, one such flange being on each side of the frames 1. The saddle 13 is provided with two legs 15, which support the saddle and all the weight applied thereto through the springs 9. The legs 15 are preferably wider at their bases than where they join the main body of said saddle 13 (Fig. 2).

The saddle 13 rests on the top 16 of the main central weight-carrying bearing box 17, formed with deep side members 18 (Fig. 2) and extending substantially the entire distance between the end bearings, hereinafter-described, or substantially one-half the length of the axle 11 between the wheels 12. A journal brass 19 is mounted within the box 17 and rests on top of the axle 11. On account of the fact that this brass 19 only carries a vertical stress, it is more important that it extend along the axis of the axle than that it subtend a large angle thereof. The two legs 15 of the saddle 13 are preferably spaced to distribute the weight applied thereto substantially uniformly along the axle, and this object is further attained by the stiffness of the said box 17, due to the depth of the side members 18 thereof. The box 17 is held in place by means of two guide plates 20, extending between the frames 1 of the locomotive and being secured to the inner sides of the opposite pedestals 2 and 3 thereof by means of bolts 21 passing through said guide plates 20 and the angle irons 22 which are secured to the inner sides of said pedestals. Suitable oiling grooves are provided but as they conform with standard practice they are not illustrated herein. The oil cellar 23 is shown, however, in broken lines.

The new form of end bearings is illustrated especially in Figs. 4, 5 and 6. Two of these bearings are provided, one at each end of the axle, and in the preferred form they do not carry any vertical weight though, if the above-described central journal box is omitted, they may do so in exactly the same manner as do the present boxes.

In the preferred form of these side bearings, as illustrated, they comprise two complementary brass castings 24 and 25, which together take the place of and conform in size with the boxes at present in use. The bearing surface 26 of the main casting 24 subtends a diameter of the axle, said diameter lying in a diagonal direction from about 45 degrees beyond the vertical line to a corresponding angle below the horizontal line (Fig. 4). As viewed in Fig. 4, its upper-right edge is formed by an upper inclined surface 27, below which a tongue or lug 28 extends out horizontally towards the right. As viewed in Fig. 5, this lug 28 is provided with a wide upper groove 29 and a corresponding lower groove 30 therein, said grooves forming side shoulders.

The complementary supplemental brass casting 25 subtends an angle of about ninety degrees with its bearing surface 31, which extends from about 45 degrees above to 45 degrees below the horizontal line. Its face which lies adjacent to the above-described main brass 24, is also provided with an upper inclined surface 32, complementary to the above surface 27, and an inward-extending horizontal groove 33, complementary to the lug 28, into which an upper lug 34, complementary to the groove 29, and a lower lug 35, complementary to the groove 30, extend and form side shoulders in the said groove 33. The horizontal complementary surfaces of the parts 28, 29, 30, 33, 34 and 35, above described, fit closely together to interlock the brass castings 24 and 25 together and permit a horizontal movement of the casting 25, relatively to the casting 24, without permitting any relative vertical movement thereof. The corresponding inclined surfaces 27 and 32, and the end vertical surfaces of the parts 28 and 33, however, do not normally come into contact with each other but are separated by sufficient space to permit adjustment of one casting 24 relatively to the other casting 25, by means of the wedge 6, or otherwise. The general form of the bearing formed by the two castings 24 and 25 corresponds with that of the usual journal boxes at present in use, and are held in position between the pedestals 2 and 3 and the shoes 5 and 6 in the same manner.

The bearing surfaces 26 and 31 are provided with suitable oiling slots 36, and the main bearing surface 26 is also provided with enlarged cavities 37. These cavities 37 break up the bearing surface and provide pockets to hold the lubricant and into which any foreign matter will quickly work, and they therefore tend to prevent the overheating of the bearings. The usual oil chambers and cellars are provided, but as they conform to standard practice they are not illustrated herein.

Thus it will be seen that, in the preferred form of my invention, the end brasses receive only the substantially horizontal thrusts due to the locomotive engine connecting rods, which are mounted on the crank pins 38, on the wheels 12, in the usual manner. These forces are continually shifting in angle and varying in intensity, and mount up to a very large stress, and they also may be reversed in direction, hence I have provided bearing surfaces, combined of the surfaces 26 and 31, which subtend about two hundred and seventy degrees of the axle, in fact all the axle except the lowest quarter. When convenient to do so, I prefer to provide a wedge shoe on each side of the journal, instead of on one side only, as shown, thereby preventing any displacement of the axle in the pedestals by the adjustment of a single wedge.

When the above-described, central weight-carrying bearing is not used, then two saddles of the usual construction are substituted for the above saddle 13 and are each interposed between the spring 9 and the top of the corresponding main casting 24, each such saddle resting in the pocket 39 (Figs. 4 and 5) provided therefor.

Thus it will be seen that the locomotive is supported by the main drive axle in a novel manner, and such support provides adequate bearing faces to care for the horizontal stresses due to the engine mechanism, as well as the vertical stresses due to the weight of the locomotive. As above stated the horizontal stresses are of extremely varying nature and, at times, such forces may momentarily amount to a figure comparable with or even exceeding that of the locomotive weight. This continually varying stress also changes in angle and for that reason it is necessary, if the wear of the brasses is to be kept low, to spread the wearing surface of the bearing almost entirely around the axle.

Though I have shown the side bearings made of a solid bearing material, such as brass, it is to be understood that the main portions thereon could be made of other metal and the bearing surfaces thereof made of a suitable bearing material inserted therein, if desired, though for many reasons I prefer to make them of solid material, as above described.

It is evident that since the above described grooves and lugs 29, 34, 30 and 35 are complementary to each other, that the side shoulders formed thereby prevent any relative motion of the castings 24 and 25 along the axle.

Having described my invention, what I claim is:—

1. A locomotive supporting structure comprising a locomotive frame; two springs secured to the two sides of said frame, whereby said frame is supported; a rigid structure extending across the frame and disconnected therefrom, and engaging and supporting both said springs at its two ends, whereby the frame is supported resiliently by said rigid cross-structure; an axle with wheels; and a bearing on said axle, midway between the wheels, and supporting said cross-structure, whereby that portion of the locomotive weight carried by said axle passes wholly thereto through said cross-structure and said central bearing.

2. A locomotive supporting structure comprising a bearing mounted on the axle, midway between the wheels; guide plates secured to and across the locomotive frame and positioned on each side of said bearing whereby said bearing is held in position on said axle but is permitted free vertical motion between said plates; a saddle supported by said bearing and extending across the locomotive frame; and two resilient means, one on each side of the locomotive, each interposed between one end of said saddle and the locomotive.

3. A locomotive journal comprising a bearing; means interposed between the bearing and the locomotive whereby the bearing supports the whole weight applied to the axle; and other bearings on the same axle, each wholly disconnected from any weight-supporting means, and each adapted to receive the engine thrust.

4. A locomotive axle journal comprising a frame with a pair of vertical pedestals; a main bearing body contacting with a half circle of the axle and engaging one said pedestal; a supplemental bearing body contacting with an additional portion of the axle and engaging the other said pedestal; and vertically interlocking means connecting said two bearing bodies whereby relative horizontal adjustment of the bearing bodies is permitted and whereby both bearing bodies move vertically together within the space between the frame pedestals.

5. A locomotive axle journal comprising a frame with a pair of vertical pedestals; a wedge cooperating with one said pedestal to adjust the open distance between said pedestals; a main bearing body contacting with a half circle of the axle; a supplemental bearing body contacting with an additional portion of the axle, both said bearing bodies lying within the open space between the pedestals; and vertically interlocking means connecting said two bearing bodies, whereby relative horizontal adjustment of the bearing bodies is permitted to conform with the adjustment of the open space between the pedestals, and whereby both said bearing bodies move vertically together within the space between the frame pedestals.

6. A locomotive axle journal as set forth in claim 5, wherein said main bearing body is provided with cavities dividing the bearing surface into smaller sections.

7. A locomotive axle journal as set forth in claim 5, wherein the bearing surface of said main bearing body subtends a diagonal diameter of the axle.

8. A locomotive axle journal as set forth in claim 5, wherein said interlocking means comprises a lug extending horizontally from one bearing body and a complementary groove in the other bearing body and fitting the upper and lower surfaces of said lug.

9. A locomotive axle journal as set forth in claim 5, wherein said interlocking means comprises a lug extending horizontally from one bearing body and a complementary groove in the other bearing body, said groove fitting the upper and lower surfaces of said lug; together with lateral shoulders formed on the lug and in the groove whereby relative motion of said bearing bodies along the axle is prevented.

JOHN A. MAGNUSSON.